US012056055B2

(12) United States Patent
Ma et al.

(10) Patent No.: US 12,056,055 B2
(45) Date of Patent: Aug. 6, 2024

(54) DATA PROCESSING DEVICE AND RELATED PRODUCT

(71) Applicant: Anhui Cambricon Information Technology Co., Ltd., Hefei (CN)

(72) Inventors: Xuyan Ma, Hefei (CN); Jianhua Wu, Hefei (CN); Shaoli Liu, Hefei (CN); Xiangxuan Ge, Hefei (CN); Hanbo Liu, Hefei (CN); Lei Zhang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 72 days.

(21) Appl. No.: 17/619,760

(22) PCT Filed: Apr. 28, 2021

(86) PCT No.: PCT/CN2021/090623
§ 371 (c)(1),
(2) Date: Jan. 19, 2023

(87) PCT Pub. No.: WO2021/223639
PCT Pub. Date: Nov. 11, 2021

(65) Prior Publication Data
US 2023/0214327 A1  Jul. 6, 2023

(30) Foreign Application Priority Data

May 8, 2020 (CN) .......................... 202010382526.6

(51) Int. Cl.
*G06F 12/0877* (2016.01)
(52) U.S. Cl.
CPC .. *G06F 12/0877* (2013.01); *G06F 2212/1016* (2013.01)

(58) Field of Classification Search
CPC ................. G06F 12/0877; G06F 2212/1016
See application file for complete search history.

(56) References Cited

U.S. PATENT DOCUMENTS

| 2015/0006811 | A1* | 1/2015 | Uehara | ............... | G06F 12/0866 711/113 |
| 2019/0138922 | A1 | 5/2019 | Liu et al. | | |
| 2021/0182077 | A1* | 6/2021 | Chen | ......................... | G06T 7/20 |

FOREIGN PATENT DOCUMENTS

| CN | 107301453 A | 10/2017 |
| CN | 107301454 A | 10/2017 |
| CN | 111047022 A | 4/2020 |

OTHER PUBLICATIONS

PCT/CN2021/090623—International Search Report and Written Opinion, mailed Jul. 29, 2021, 10 pages.

* cited by examiner

*Primary Examiner* — Baboucarr Faal
(74) *Attorney, Agent, or Firm* — Getech Law LLC; Jun Ye

(57) ABSTRACT

A data processing device and related products are provided. The data processing device includes: a decoding unit, a discrete address determining unit, a continuous data caching unit, a data read/write unit, and a storage unit. Through the data processing device, the processing instruction may be decoded and executed, and the discrete data may be transferred to a continuous data address, or the continuous data may be stored to a plurality of discrete data addresses. As such, a vector computation of the discrete data and vector data restoration after the vector computation may be implemented, which may simplify a processing process, thereby reducing data overheads. In addition, according to the embodiments of the disclosure, when the discrete data is read, by caching a storage address corresponding to a read (Continued)

request, a read request of each piece of data may be merged to read one or more pieces of discrete data, thereby improving reading efficiency of the data.

10 Claims, 4 Drawing Sheets

DATA PROCESSING DEVICE AND RELATED PRODUCT

CROSS-REFERENCE TO RELATED APPLICATION

This is a 371 of International Application No. PCT/CN2021/090623, filed Apr. 28, 2021 which claims priority to Chinese Patent Application No. 202010382526.6, filed on May 8, 2020, and entitled "DATA PROCESSING DEVICE AND RELATED PRODUCTS", the entire disclosure of which is incorporated herein by reference.

TECHNICAL FIELD

This disclosure relates to the technical field of computers and particularly relates to a data processing device and related products.

BACKGROUND

With the development of artificial intelligence technology, the artificial intelligence technology has made great progress in image recognition and other fields. During the image recognition, a large number of discrete data points may be required to be processed (for example, a difference computation may be required to be performed). However, based on related technologies, a process of processing the discrete data points is relatively complicated, resulting in relatively large data overheads.

SUMMARY

In view of this, it is necessary to provide a data processing device and related products, to solve the technical problem above.

According to a first aspect of the disclosure, a data processing device is provided. The data processing device includes: a decoding unit, a discrete address determining unit, a continuous data caching unit, a data read/write unit, and a storage unit.

The decoding unit is configured to decode a processing instruction received to obtain a processing instruction decoded, and determine a plurality of pieces of data corresponding to the processing instruction, a base address of source data of the plurality of pieces of data, a base address of destination data of the plurality of pieces of data, a data offset address of discrete data of the plurality of pieces of data, and a data size of continuous data, where source data of the plurality of pieces of data includes the discrete data or the continuous data. The decoding unit is further configured to determine a first storage address of continuous data according to a base address of the continuous data and the data size of the continuous data.

The discrete address determining unit is coupled with the decoding unit and the data read/write unit, and the discrete address determining unit is configured to: determine a second storage address of the discrete data according to a base address of the discrete data and the data offset address of the discrete data; and send the second storage address to the data read/write unit.

The continuous data caching unit is coupled with the decoding unit and the data read/write unit, and the continuous data caching unit is configured to create a caching space for the continuous data, cache the continuous data of the first storage address into the caching space and send the continuous data to the data read/write unit, or cache the continuous data received from the data read/write unit into the caching space and send the continuous data to the first storage address.

The data read/write unit is coupled with the storage unit. The data read/write unit is configured to read the discrete data from the storage unit according to the second storage address of the discrete data and send the discrete data read to the continuous data caching unit, or receive the continuous data from the continuous data caching unit and write the continuous data received into the storage unit according to a storage address of the discrete data. The data read/write unit includes a merge request caching subunit. The merge request caching subunit is configured to cache storage addresses corresponding to a plurality of read requests when the discrete data is read by the data read/write unit, so that each read request is merged to read one or more pieces of discrete data.

According to a second aspect of the disclosure, an artificial intelligence chip is provided. The artificial intelligence chip includes the data processing device above.

According to a third aspect of the disclosure, an electronic device is provided. The electronic device includes the artificial intelligence chip above.

According to a fourth aspect of the disclosure, a board card is provided. The board card includes a storage component, an interface device, a control component, and the artificial intelligence chip above. The artificial intelligence chip is coupled with the storage component, the control component, and the interface device respectively. The storage component is configured to store data. The interface device is configured to implement data transmission between the artificial intelligence chip and an external device. The control component is configured to monitor a state of the artificial intelligence chip.

According to embodiments of the disclosure, the processing instruction may be decoded and executed, and the discrete data may be transferred to a continuous data address, or the continuous data may be stored to a plurality of discrete data addresses. As such, a vector computation of the discrete data and vector data restoration after the vector computation may be implemented, which may simplify a processing process, thereby reducing data overheads. In addition, according to the embodiments of the disclosure, when the discrete data is read, by caching a storage address corresponding to a read request, a read request of each piece of data may be merged to read one or more pieces of discrete data, thereby improving reading efficiency of the data.

By deriving technical features of CLAIMS, advantageous effects corresponding to the technical problem in the BACKGROUND may be achieved. According detailed descriptions of exemplary embodiments with reference to drawings below, other features and aspects of the disclosure will become clear.

BRIEF DESCRIPTION OF THE DRAWINGS

Drawings contained in the specification and constituting a part of the specification together with the specification illustrate exemplary embodiments, features, and aspects of the disclosure, and the drawings are used to explain principles of the disclosure.

DETAILED DESCRIPTION

Figure 1:
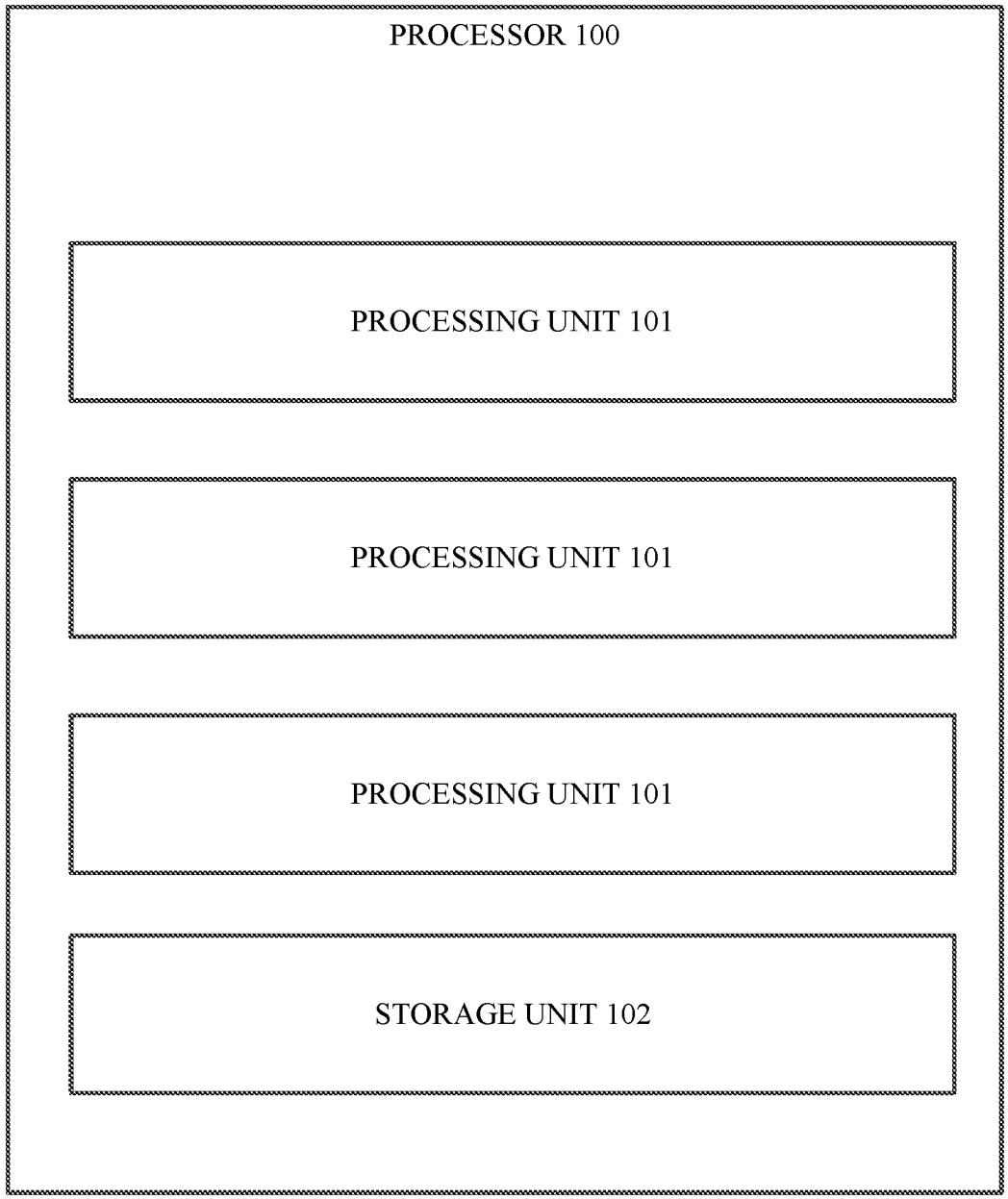
FIG. 1 is a schematic diagram illustrating a processor of a data processing device according to an embodiment of the disclosure.

Hereinafter, technical solutions of embodiments of the disclosure will be described in a clear and comprehensive manner with reference to drawings. Obviously, the embodiments described herein are some rather than all embodiments of the disclosure. Those of ordinary skill in the art will be able to derive other embodiments based on these embodiments without creative efforts, and all such derived embodiments shall all fall within the protection scope of the disclosure.

It should be understood that, terms such as "include/comprise" and "contain" as well as variations thereof used in the specification and CLAIMS of the disclosure mean existence of features, wholes, steps, operations, elements, and/or components described, but do not exclude existence or addition of one or more other features, wholes, steps, operations, elements, components, and/or sets.

It should also be understood that, terms used in the specification of the disclosure are merely for describing a specific embodiment, and not intended to limit the disclosure. As used in the specification and CLAIMS of the disclosure, unless the context clearly indicates otherwise, singular forms such as "a/an", "a piece of", and "the/this" also include plural forms. It should be further understood that, a term "and/or" used in the specification and CLAIMS of the disclosure refers to any combination of one or more of items listed in association and all possible combinations, and includes these combinations.

As used in the specification and CLAIMS, a term "if" may be interpreted as "when", "once", "in response to determining", or "in response to detecting" depending on the context. Similarly, a term "if determining" or "if detecting [the condition or event described]" may be interpreted as "once determining", "in response to determining", "once detecting [the condition or event described]", or "in response to detecting [the condition or event described]" depending on the context.

A data processing device of the embodiments of the disclosure may be applied to a processor. The processor may be a general-purpose processor, such as a central processing unit (CPU), or an intelligence processing unit (IPU) configured to perform artificial intelligence computations. The artificial intelligence computation may include a machine learning computation, a brain-like computation, and the like. The machine learning computation may include a neural network computation, a k-means computation, a support vector machine computation, and the like. The IPU may include, for example, one or a combination of a graphics processing unit (GPU), a neural-network processing unit (NPU), a digital signal process (DSP), and a field-programmable gate array (FPGA) chip. The type of the processor is not limited in the disclosure.

In a possible implementation, the processor of the disclosure may include a plurality of processing units, and each of the plurality of processing units may independently run various tasks assigned, such as a convolution computation task, a pooling task, or a fully-connected task. The processing units and the tasks run by the processing units are not limited in the disclosure.

FIG. 1 is a schematic diagram illustrating a processor of a data processing device according to an embodiment of the disclosure. As illustrated in FIG. 1, a processor 100 includes a plurality of processing units 101 and a storage unit 102. The plurality of processing units 101 are configured to execute instruction sequences. The storage unit 102 is configured to store data. The storage unit 102 may include a random access memory (RAM) and a register file. The plurality of processing units 101 of the processor 100 may not only share part of a storage space (for example, the plurality of processing units 101 of the processor 100 may share part of the storage space of the RAM and the register file), but also have their own storage spaces.

Figure 2:
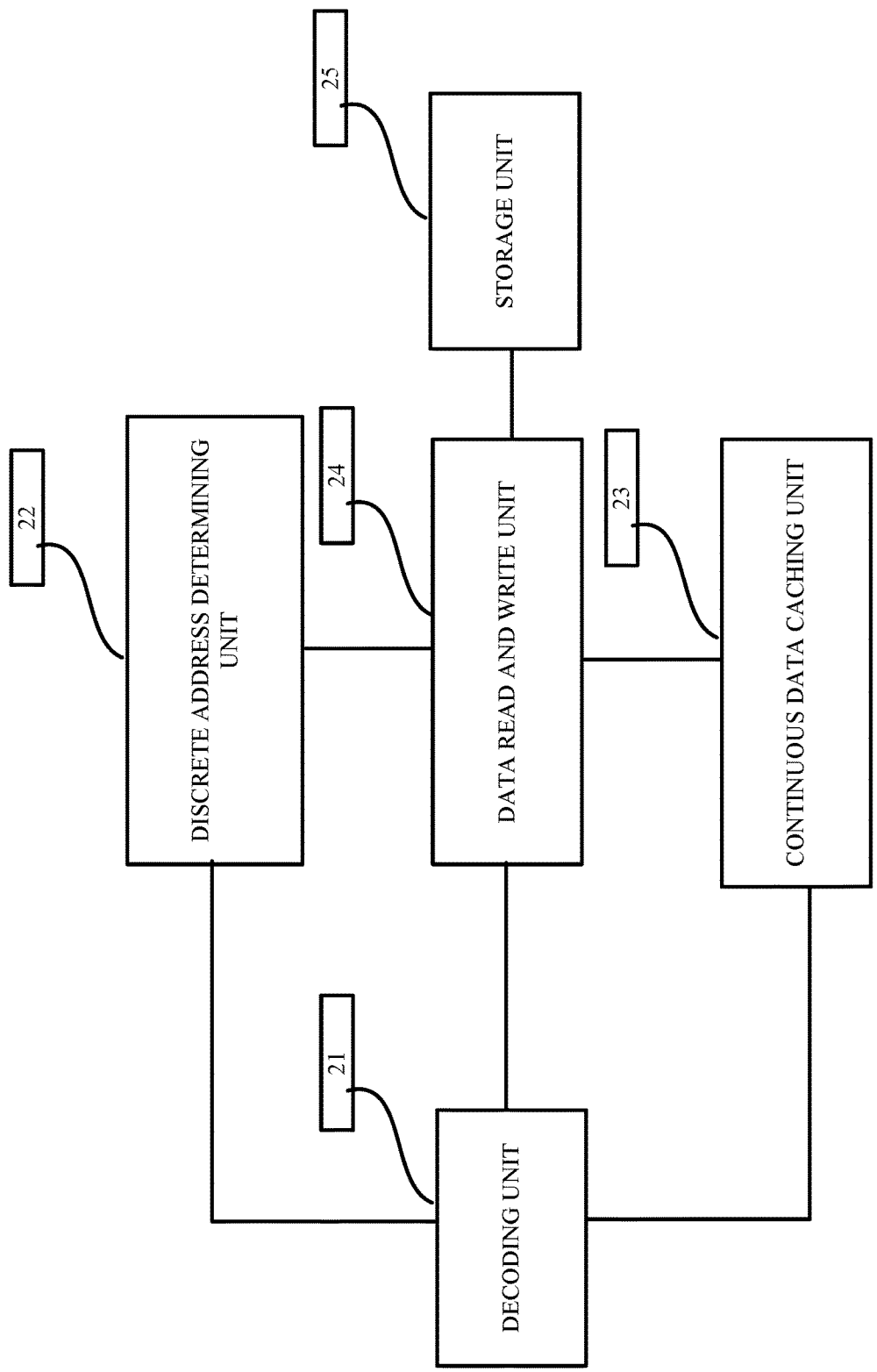
FIG. 2 is a block diagram illustrating a data processing device according to an embodiment of the disclosure.

FIG. 2 is a block diagram illustrating a data processing device according to an embodiment of the disclosure. As illustrated in FIG. 2, the device includes a decoding unit 21 (a decoder (DEC)), a discrete address determining unit 22, a continuous data caching unit 23 (a continuous data buffer (CDB)), a data read/write unit 24, and a storage unit 25.

The decoding unit 21 is configured to decode a processing instruction received to obtain a processing instruction decoded; determine a plurality of pieces of data corresponding to the processing instruction, a source data base address of the plurality of pieces of data, a destination data base address of the plurality of pieces of data, a data offset address of discrete data of the multiple pieces of data, and a data size of continuous data, where source data of the plurality of pieces of data includes the discrete data or the continuous data; and determine a first storage address of the continuous data according to a base address of the continuous data and the data size of the continuous data.

The discrete address determining unit 22 is coupled with the decoding unit 21 and the data read/write unit 24, and the discrete address determining unit 22 is configured to determine a second storage address of the discrete data according to a base address of the discrete data and the data offset address of the discrete data, and send the second storage address to the data read/write unit.

The continuous data caching unit 23 is coupled with the decoding unit 21 and the data read/write unit 24. The continuous data caching unit 23 is configured to create a caching space for the continuous data; and cache the continuous data of the first storage address into the caching space and send the continuous data to the data read/write unit, or cache the continuous data received from the data read/write unit into the caching space and send the continuous data to the first storage address.

The data read/write unit 24 is coupled with the storage unit 25. The data read/write unit 24 is configured to read the discrete data from the storage unit according to the second storage address of the discrete data and send the discrete data read to the continuous data caching unit, or receive the continuous data from the continuous data caching unit and write the continuous data received into the storage unit according to a storage address of the discrete data.

The data read/write unit includes a merge request caching subunit (a merge request buffer (MRB)) configured to cache storage addresses corresponding to a plurality of read requests during a period where the discrete data is read by the data read/write unit, so that each read request is merged to read one or more pieces of discrete data.

The data processing device of embodiments of the disclosure may realize a vector address access (VAA) function and may support a corresponding functional instruction, such as a data transfer instruction (for example, a Gather Load), a discrete storage instruction (for example, a Scatter Store), and a vector extension instruction (for example, a Vector Extension). The data transfer instruction is used to aggregate contents of a group of discrete addresses into a continuous data vector. The discrete storage instruction is used to store the continuous data vector to the group of discrete addresses in a distributed manner. The vector extension instruction is used to extend and store the continuous data vector according to an extension parameter. The count and type of instructions supported by the device are not limited in the disclosure.

For example, the decoding unit 21 may obtain, from an instruction issue queue (an issue queue (ISQ)) upstream of the device, a processing instruction to be decoded, and decode (or code) the processing instruction to obtain the processing instruction decoded. The processing instruction decoded may include an operation code and an operation field, where the operation code indicates a processing type of the processing instruction, and the operation field indicates data to be processed and a data parameter.

In a possible implementation, the decoding unit 21 may determine, according to an operation field, the plurality of pieces of data corresponding to the processing instruction decoded and data parameters of the plurality of pieces of data, such as the source data base address of the plurality of pieces of data, the destination data base address of the plurality of pieces of data, the data offset address of the discrete data of the plurality of pieces of data, and the data size for example, a single point data size of the continuous data, where the source data of the plurality of pieces of data includes the discrete data or the continuous data. For example, if the processing instruction is the data transfer instruction, the source data of the plurality of pieces of data is the discrete data, and destination data of the plurality of pieces of data is the continuous data; if the processing instruction decoded is the discrete storage instruction, the source data of the plurality of pieces of data is the continuous data, and the destination data of the plurality of pieces of data is the discrete data. The decoding unit 21 may store a count of pieces of data to be processed (for example, a single point data number) and a data parameter of each piece of data, and send the base address of the discrete data and the data offset address of the discrete data to the discrete address determining unit 22.

In a possible implementation, the discrete address determining unit 22 may determine the second storage address of the discrete data according to a received data offset address of the discrete data and a received base address of the discrete data. The data offset address of the discrete data may include an offset size and an offset vector base address of an offset of the discrete data in an external memory (for example, a random access memory (RAM)). The discrete address determining unit 22 may read, according to the offset vector base address and the offset size, an offset of each piece of discrete data from the external memory (for example, the RAM) through bus port share. The discrete address determining unit 22 may further calculate a second storage address of each piece of discrete data in the storage unit 25 according to the offset vector base address of each piece of discrete data and the offset of each piece of discrete data that are stored in the storage unit 25. The discrete address determining unit 22 may send the second storage address of each piece of discrete data to the data read/write unit 24 sequentially.

In a possible implementation, the data read/write unit 24 may read the discrete data from the storage unit 25 or write the discrete data into the storage unit 25 according to the second storage address of the discrete data. For example, if the processing instruction is the data transfer instruction, the data read/write unit 24 may read each piece of discrete data from the storage unit 25 sequentially according to the second storage address and may send the discrete data read to the continuous data caching unit 23. If the processing instruction is the discrete storage instruction, the data read/write unit 24 may receive the continuous data sent by the continuous data caching unit 23 and write the continuous data received into the storage unit 25 according to the second storage address of the discrete data.

In a possible implementation, the data read/write unit may include the merge request caching subunit. The merge request caching subunit may be configured to cache the storage addresses corresponding to the plurality of read requests during the period where the discrete data is read by the data read/write unit, so that each read request may be merged to read one or more pieces of discrete data, thereby improving the reading efficiency of the data.

In a possible implementation, the storage unit 25 may be a VAA cache (VAC) that implements the vector address access, and the type of the storage unit 25 is not limited in the disclosure.

In a possible implementation, the decoding unit 21 may be further configured to: determine the first storage address of the continuous data according to the base address of the continuous data and the data size of the continuous data, and send the first storage address to the continuous data caching unit 23. The first storage address may be an address of the continuous data in the external memory (for example, the RAM).

$$\text{Single Point Continuous Addr}[n] = \text{Continuous Data Base Address} + (n-1)*\text{Single Point Data Size} \quad (1).$$

In this formula (1), Single Point Continuous Addr[n] represents a data address of the $n^{th}$ piece of continuous data, Continuous Data Base Address represents the base address of the continuous data, and Single Point Data Size represents the data size of the continuous data. For example, if the base address is Addr1 [0,3], and a data size of a piece of single data is 4 bits, and n is 3, a data address of the $3^{rd}$ piece of continuous data is determined to be Addr1 [8,11].

In a possible implementation, the continuous data caching unit 23 may create the caching space of the continuous data. The continuous data caching unit 23 may cache the continuous data of the first storage address into the caching space and send the continuous data to the data read/write unit, or cache the continuous data received from the data read/write unit into the caching space and send the continuous data to the first storage address.

For example, if the processing instruction is the data transfer instruction, the data read/write unit 24 may send the discrete data read to the continuous data caching unit 23, and the continuous data caching unit 23 may cache the discrete data as the continuous data in the caching space and send the continuous data cached to the first storage address. If the processing instruction is the discrete storage instruction, the continuous data caching unit 23 may read the continuous data from the first storage address of the external memory (for example, the RAM) through the bus port share and cache the continuous data read into the caching space and send the continuous data to the data read/write unit 24 sequentially, so that the data read/write unit 24 may store each piece of continuous data to the second storage address of the storage unit 25, to obtain the discrete data.

According to embodiments of the disclosure, the processing instruction may be decoded and executed, and the discrete data may be transferred to a continuous data address, or the continuous data may be stored to a plurality of discrete data addresses. As such, a vector computation of the discrete data and vector data restoration after the vector computation may be implemented, which may simplify a processing process, thereby reducing data overheads. In addition, according to the embodiments of the disclosure, by caching the storage address corresponding to the read request, when the discrete data is read, each read request may be merged to read one or more pieces of discrete data, thereby improving the reading efficiency of the data.

Figure 3:
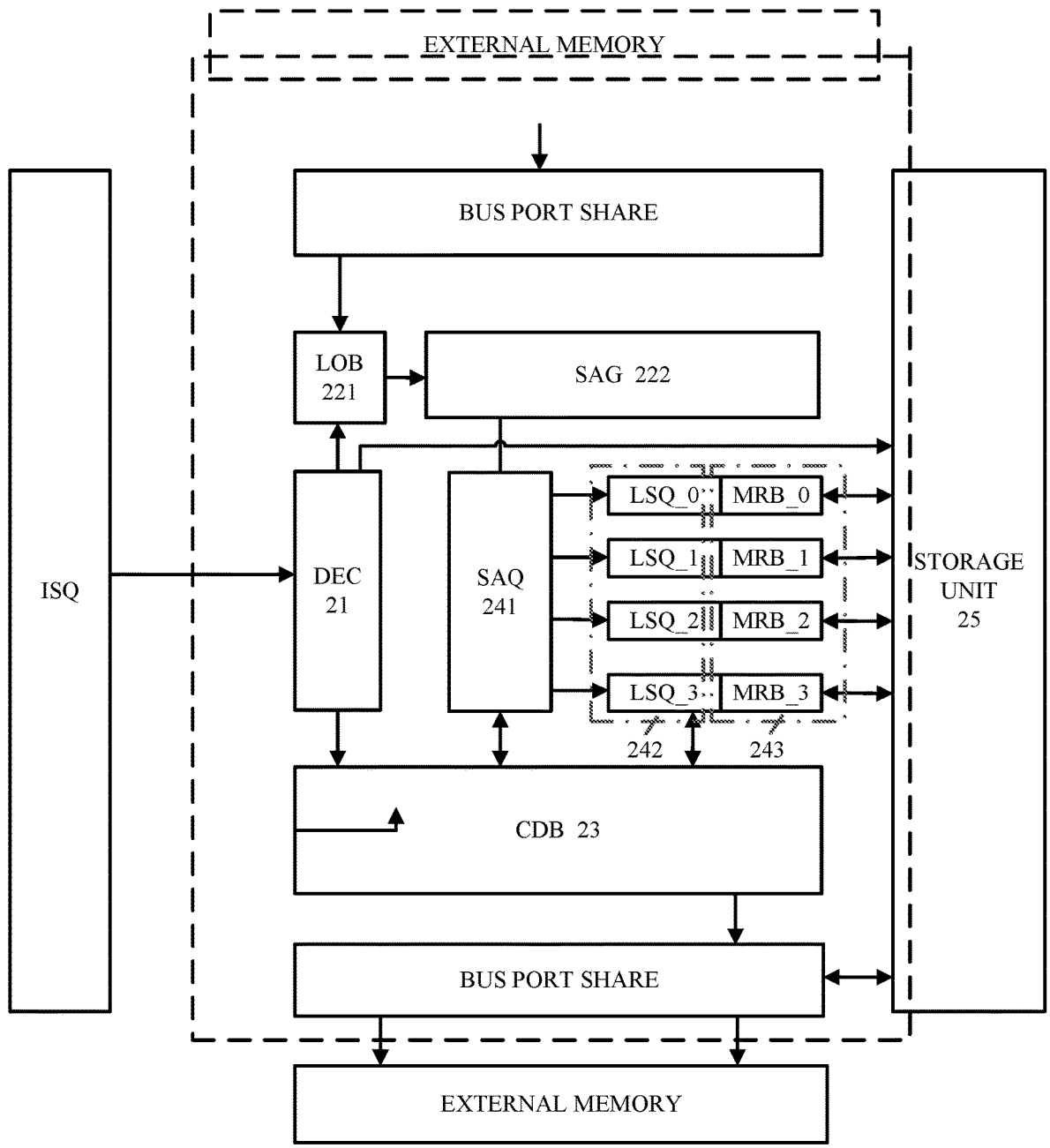
FIG. 3 is a block diagram illustrating a data processing device according to an embodiment of the disclosure.

FIG. 3 is a block diagram illustrating a data processing device according to an embodiment of the disclosure. As illustrated in FIG. 3, in a possible implementation, the discrete address determining unit 22 may include an offset load subunit 221 (a load offset buffer (LOB)) and a discrete address generation subunit 222 (a scatter addr. generator (SAG)).

The offset load subunit 221 may be configured to determine an offset storage address of each piece of discrete data respectively according to an offset size and an offset vector base address of discrete data. The offset load subunit 221 may be configured to read an offset of each piece of discrete data from the offset storage address of each piece of discrete data.

The discrete address generation subunit 222 may be configured to determine a second storage address of each piece of discrete data respectively according to the offset of each piece of discrete data and a base address of the discrete data. The discrete address generation subunit 222 may be configured to send the second storage address to the data read/write unit.

For example, the offset load subunit 221 may cache the base address of the discrete data and a data offset address of the discrete data which are sent by the decoding unit 21. The offset load subunit 221 may read the offset of each piece of discrete data from an external memory (for example, a random access memory (RAM)) through bus port share according to the offset vector base address and the offset size in the data offset address. The offset load subunit 221 may cache the offset read and sequentially send the base address of each piece of discrete data and the offset of each piece of discrete data in the storage unit 25 to the discrete address generation subunit 222.

In a possible implementation, the discrete address generation subunit 222 may calculate the second storage address of each piece of discrete data in sequence according to the offset of each piece of discrete data and the base address of the each piece of discrete data.

$$\text{Single Point Scatter Addr}[n] = \text{Scatter Data Base Address} + \text{Offset Address}[n] \quad (2).$$

In this formula (2), Single Point Scatter Addr[n] represents a second storage address of the $n^{th}$ piece of discrete data, Scatter Data Base Address represents the base address of the discrete data, and Offset Address[n] represents an offset of the $n^{th}$ piece of discrete data. For example, if the base address is Addr2 [4] and the offset is [24, 27], the second storage address of the $n^{th}$ piece of discrete data is determined to be Addr2 [28, 31].

In a possible implementation, the discrete address generation subunit 222 may send the calculated second storage address of the discrete data to the data read/write unit 24 sequentially, so that the data read/write unit 24 may read or write the discrete data.

In this way, the second storage address of each piece of discrete data may be determined.

As illustrated in FIG. 3, in a possible implementation, the data read/write unit 24 may include a discrete address queue (a scatter addr. queue (SAQ)) subunit 241 and a storage load queue (a load store queue (LSQ)) subunit 242.

The discrete address queue subunit 241 may be configured to receive and store the second storage address of the discrete data.

The storage load queue subunit 242 may be configured to read the discrete data from the storage unit according to the second storage address of the discrete data and send the discrete data read to the continuous data caching unit, or receive the continuous data from the continuous data caching unit and write the continuous data received into the storage unit according to a storage address of the discrete data.

For example, the discrete address queue subunit 241 may receive and cache the second storage address of each piece of discrete data to form a discrete address queue and establish a correspondence between each piece of discrete data and a caching address of a caching space in the continuous data caching unit 23, so that the discrete data read may be placed in the caching space caching space correspondingly.

In a possible implementation, the storage load queue subunit 242 may include a plurality of storage load queues. For example, in FIG. 3, there are four storage load queues including LSQ_0, LSQ_1, LSQ_2, and LSQ_3, so as to increase the reading or writing speed of the discrete data, where each LSQ may be, for example, a first-in-first-out (FIFO) memory. The discrete address queue subunit 241 may send the second storage address of each piece of discrete data to each storage load queue respectively in order. When the discrete data is read, each storage load queue may read the discrete data from the storage unit and send the discrete data read to a corresponding caching address of the caching space. When the discrete data is written, each storage load queue may receive continuous data of each caching address of the caching space respectively and write each piece of continuous data to a corresponding second storage address of the storage unit.

In this way, a process of reading or writing the discrete data may be implemented, thereby completing a corresponding processing instruction.

In a possible implementation, as illustrated in FIG. 3, the merge request caching subunit 243 of the data read/write unit 24 includes merge request caches including MRB_0, MRB_1, MRB_2, MRB_3. The merge request caches including MRB_0, MRB_1, MRB_2, MRB_3 correspond to the storage load queues including LSQ_0, LSQ_1, LSQ_2, LSQ_3. Each of the merge request caches is coupled with a corresponding storage load queue and the storage unit 25. The merge request caching subunit 243 may be configured to:

judge whether an address corresponding to a same caching line as a target address of a read request has been cached when the read request from the storage load queue subunit is received;

if no address corresponding to the same caching line as the target address has been cached, cache the target address and send the read request to the storage unit, where the read request is used to request the storage unit to return a plurality of pieces of data in a target caching line corresponding to the target address; and if the storage unit returns the plurality of pieces of data in the target caching line, backfill one or more pieces of data to the storage load queue subunit, where the one or more pieces of data are data whose address corresponds to the target caching line, among data that has sent the read request to the merge request caching subunit.

For example, for any LSQ, an MRB corresponding to the LSQ may cache a plurality of discrete data addresses (for example, eight addresses). Those skilled in the art may set, according to actual needs, a count of cacheable addresses for each MRB, which is not limited in the disclosure.

In a possible implementation, when the discrete data is read by the data read/write unit, the second storage address of the discrete data may be sent to the LSQ, and the LSQ may send the read request, where the read request may include a target address of data to be read, and the storage unit may return, according to the read request, the plurality of pieces of data in the target caching line corresponding to the target address.

In a possible implementation, the LSQ may send the read request to the MRB first. Upon receiving the read request, the MRB may judge whether the address corresponding to the same caching line as the target address of the read request has been cached. If the address corresponding to the same caching line as the target address of the read request has been cached by the MRB, the storage unit may return data of an entire caching line when returning data of this address. In other words, data of the target address may be returned in a merged manner, and there is no need to send the read request repeatedly. In this case, the MRB may not be required to send the read request to the storage unit, so as to reduce a count of requests.

In a possible implementation, if no address corresponding to the same caching line as the target address has been cached by the MRB, data of the target address may not be returned in the merged manner, and the read request needs to be sent to the storage unit. In this case, the MRB may cache the target address and send the read request to the storage unit, so that the storage unit may return, according to the read request, the plurality of pieces of data of the target caching line corresponding to the target address.

In a possible implementation, if the MRB is not full, the target address may be cached directly; and if the MRB is full, an address with the earliest cache time in the MRB may be deleted, and then the target address may be cached.

In a possible implementation, when the plurality of pieces of data in the target caching line are returned by the storage unit, the MRB may backfill one or more pieces of data to the LSQ, so as to complete a process of data reading. The one or more pieces of data are the data whose address corresponds to the target caching line, among the data that has sent the read request to the MRB. In other words, at least data of the target address may be read, and other pieces of data in the same target caching line may also be read.

In a possible implementation, the merge request caching subunit may be further configured to delete the target address associated with the read request. In other words, after reading of data of the target address of the read request is completed, the target address may be deleted, so as to release the caching space of the MRB.

In this way, each read request may be merged to read one or more pieces of discrete data. In practice, two or more pieces of data may be read through each read request, which significantly improves reading efficiency of the data.

The process of executing various processing instructions by the data processing device will be described below.

In a possible implementation, the processing instruction may include a data transfer instruction. If the processing instruction decoded is the data transfer instruction, source data of the plurality of pieces of data is the discrete data, destination data of the plurality of pieces of data is the continuous data, a source data base address is a base address of the discrete data, and a destination data base address is a base address of the continuous data. The data read/write unit may be configured to:

read the discrete data from the storage unit according to a storage address of the discrete data; and send the discrete data read to the continuous data caching unit.

The continuous data caching unit may be configured to:

cache the discrete data received from the data read/write unit into a caching space to obtain the continuous data; and send the continuous data in the caching space to a first storage address of an external memory if a count of pieces of continuous data in the caching space reaches a first preset quantity.

For example, the data transfer instruction (for example, a Gather Load) is used to aggregate contents of a set of discrete addresses into a continuous data vector. If the processing instruction decoded by the decoding unit 21 is the data transfer instruction, the source data is the discrete data, and the destination data is the continuous data. On the one hand, the decoding unit 21 may store the count of pieces of discrete data, and may send the base address of the discrete data and the data offset address of the discrete data to the discrete address determining unit 22, so that the discrete address determining unit 22 may calculate a second storage address of each piece of discrete data and sequentially send the second storage address to the data read/write unit 24. On the other hand, the decoding unit 21 may determine a first storage address of the continuous data according to the base address of the continuous data and the data size of the continuous data, and may send the first storage address to the continuous data caching unit 23. The specific processing process will not be repeated herein.

In a possible implementation, the data read/write unit 24 may allocate a caching space ID (for example, a buffer ID) for each discrete data point in an SAQ according to a sequential allocatable cache pointer of the continuous data caching unit 23, so that a correspondence between the second storage address of each piece of discrete data and the buffer ID may be established. Then, the discrete address queue subunit 241 may send the second storage address of each piece of discrete data to each storage load queue sequentially and respectively. Each storage load queue may read each piece of discrete data from the storage unit 25 according to the second storage address respectively, and may send the discrete data read to the caching space of the continuous data caching unit 23.

In a possible implementation, the continuous data caching unit 23 may sequentially cache each piece of discrete data into the caching space according to a buffer ID of each piece of discrete data to form the continuous data (which may be called vector data). Once the count of pieces of continuous data in the caching space reaches the first preset quantity, the continuous data in the caching space may be sent to the first storage address of the external memory through bus port share. The first preset quantity herein may be equal to the count of pieces of continuous data capable of being cached in the caching space; in other words, the continuous data may be sent to the first storage address of the external storage once the caching space is full. The first preset quantity herein may also be smaller than the count of pieces of continuous data capable of being cached in the caching space, which is not limited in the disclosure.

On condition that all pieces of discrete data are sent to the first storage address, the vector data with a preset length may be obtained, thereby completing execution of the data transfer instruction. Furthermore, the vector data may be further processed according to a data computation instruction, such as a four arithmetic computation on at least two pieces of vector data, or a difference computation on two pieces of vector data.

In this way, in an application scenario such as image recognition where a large number of paired discrete data points are required to be computed, the discrete data may be transferred to a continuous address space according to the data transfer instruction to be aggregated into the vector data for a vector computation. As such, computation of discrete data points may be converted into the vector computation, which may simplify a processing process, thereby reducing data overheads.

In a possible implementation, the processing instruction may include a discrete storage instruction. If the processing instruction decoded is the discrete storage instruction, the source data of the plurality of pieces of data is the continuous data, the destination data of the plurality of pieces of data is the discrete data, the source data base address is the base address of the continuous data, and the destination data base address is the base address of the discrete data.

The continuous data caching unit may be configured to:
read the continuous data from the first storage address of the external memory;
cache the continuous data read into the caching space; and
send the continuous data in the caching space to the data read/write unit if the count of pieces of continuous data in the caching space reaches a second preset quantity.

The data read/write unit may be configured to:
receive the continuous data from the continuous data caching unit; and
write the continuous data received into the storage unit according to the storage address of the discrete data.

For example, the discrete storage instruction (for example, a Scatter Store) is used to store a continuous data vector to a set of discrete addresses in a distributed manner. If the processing instruction decoded by the decoding unit 21 is the discrete storage instruction, the source data is the continuous data and the destination data is the discrete data. On the one hand, the decoding unit 21 may store the count of pieces of discrete data, and may send the base address of discrete data and the data offset address of the discrete data to the discrete address determining unit 22, so that the discrete address determining unit 22 may calculate the second storage address of each piece of discrete data and sequentially send the second storage address to the data read/write unit 24. On the other hand, the decoding unit 21 may determine the first storage address of the continuous data according to the base address of the continuous data and the data size of the continuous data, and may send the first storage address to the continuous data caching unit 23. The specific processing process will not be repeated herein.

In a possible implementation, the continuous data caching unit 23 may create a caching space for the continuous data. The continuous data caching unit 23 may send a data read request to an external memory (for example, a dynamic random access memory (DRAM) or a CT-RAM) through the bus port share according to the first storage address of the continuous data, and sequentially backfill the continuous data returned by the external memory into the caching space. Once the count of pieces of continuous data in the caching space reaches a second preset quantity, the continuous data caching unit 23 may send the continuous data in the caching space to the data read/write unit 24. The second preset quantity herein may be equal to the count of pieces of continuous data capable of being cached in the caching space; in other words, the continuous data is sent once the caching space is full. The second preset quantity herein may also be less than the count of pieces of continuous data capable of being cached in the caching space, which is not limited in this disclosure.

In a possible implementation, the data read/write unit 24 may be configured to allocate the caching space ID (for example, the buffer ID) for each discrete data point in the SAQ according to the sequential allocatable cache pointer of the continuous data caching unit 23, so that the correspondence between the second storage address of each piece of discrete data and the buffer ID (also known as an exponential index) may be established. Then, the discrete address queue subunit 241 may sequentially send the buffer ID and the second storage address of each piece of discrete data to each LSQ respectively.

In a possible implementation, when the LSQ is ready to write data into the storage unit, data at a buffer ID (also called the exponential index) of discrete data to be written should have been sent (or backfilled) to the LSQ. In this case, the LSQ may write the discrete data to a corresponding second storage address of the storage unit. In this way, the discrete data is continuously written in sequence, so as to complete writing of all data. After all data is written to the storage unit, the storage unit 25 may further write the discrete data into the external memory (for example, the DRAM or the CT-RAM) through the bus port share.

In a possible implementation, the decoding unit 21 may read state information of the LSQ, the CDB, and the like, so as to determine an execution state of a present instruction and determine whether execution of the present instruction is completed. After execution of a present discrete storage instruction is completed, the decoding unit 21 may further send a clean VAC operation to the storage unit 25 (for example, a VAC), so as to clear data in the storage unit and start to execute a new instruction.

In this way, pieces of data of vector data may be scatteredly stored to discrete address spaces according to the discrete storage instruction, to obtain a plurality of pieces of discrete data. As such, in the application scenario (for example, the image recognition), after a vector computation on a large number of discrete paired data points is performed, a vector computed is scatteredly stored as discrete data points to obtain discrete processing results, which may simplify the processing process, thereby reducing the data overheads.

In a possible implementation, the processing instruction may include the data transfer instruction. If the processing instruction decoded is the data transfer instruction, the source data of the plurality of pieces of data is the discrete data, the destination data of the plurality of pieces of data is the continuous data, the source data base address is the base address of the discrete data, and the destination data base address is the base address of the continuous data. The decoding unit may be further configured to:
determine a transfer mode of the data transfer instruction if the processing instruction decoded is the data transfer instruction;
if the transfer mode of the data transfer instruction is a multi-vector transfer mode, determine a source data base address of a plurality of pieces of first data, a destination data base address of the plurality of pieces of first data, a data offset address of the plurality of pieces of first data, an offset stride of a plurality of pieces of second data, and destination base address strides of the plurality of pieces of second data in an operation field of the data transfer instruction;
determine a third storage address of the plurality of pieces of first data according to the destination data base address of the plurality of pieces of first data and the data size of the continuous data; and determine a fourth storage address of the plurality of pieces of second data according to the third storage address of the plurality of pieces of first data and the destination base address strides of the plurality of pieces of second data.

The discrete address determining unit may be further configured to:

determine a fifth storage address of the plurality of pieces of first data respectively according to the data offset address of the plurality of pieces of first data and the source data base address of the plurality of pieces of first data;

determine a sixth storage address of the plurality of pieces of second data respectively according to the fifth storage address of the plurality of pieces of first data and the offset stride of the plurality of pieces of second data; and send the fifth storage address and the sixth storage address to the data read/write unit.

The data read/write unit may be further configured to:

read first data from the storage unit according to the fifth storage address and read second data from the storage unit according to the sixth storage address; and send the first data read and the second data read to the continuous data caching unit.

The continuous data caching unit may be further configured to:

create caching space for the plurality of pieces of first data and the plurality of pieces of second data respectively;

cache the first data and the second data received from the data read/write unit into the caching space respectively; and send the continuous data in the caching space to the third storage address of the external memory once a count of pieces of first data in the caching space reaches a third preset quantity, and send the continuous data in the caching space to the fourth storage address of the external memory once a count of pieces of second data in the caching space reaches the third preset quantity.

For example, the transfer mode of the data transfer instruction may be set in advance, and may include a single vector transfer mode (for example, expressed as a "Mode0"), the multi-vector transfer mode (for example, expressed as a "Mode1"), etc. In the single vector transfer mode, the data transfer instruction may be used to aggregate a plurality of discrete data points into one piece of vector data. In the multi-vector transfer mode, the data transfer instruction may be used to aggregate the plurality of discrete data points into at least two pieces of vector data. The transfer mode may be determined according to a field indicative of the transfer mode in the operation field of the data transfer instruction, such as a field "Mode0" or a field "Mode1", which is not limited in the disclosure.

When pairs or sets of discrete points are required to be transferred to perform a computation (for example, a difference computation), since adjacent points are generally in a same caching line, by adopting the multi-vector transfer mode, two or more data points may be obtained by fetching one data point once and finally, two or more different vectors may be generated, which is conducive to performing the vector computation to obtain a final result (for example, a difference vector).

In a possible implementation, if the processing instruction decoded is the data transfer instruction, the decoding unit 21 may determine the transfer mode of the data transfer instruction (for example, expressed as a "gather load offset mode"). If the transfer mode of the data transfer instruction is the multi-vector transfer mode, the decoding unit 21 may determine a destination data address and a source data address of each data point to be transferred. The source data address herein represents present data storage addresses of a plurality of data points in a data storage space, which are the plurality of discrete data addresses. The destination data address herein represents data addresses in a data storage space to which the plurality of data points are to be transferred, which are continuous data addresses. The data storage space corresponding to the source data address and the data storage space corresponding to the destination data address may be the same or different, which is not limited in the disclosure.

In a possible implementation, in the multi-vector transfer mode, at least two vectors may be obtained. The first vector is set as first vector data, and the other vectors are set as second vector data (including at least one piece of vector data). The operation field of the data transfer instruction may include the source data base address of the plurality of pieces of first data, the destination data base address of the plurality of pieces of first data, and the data offset address of the plurality of pieces of first data. The operation field of the data transfer instruction may also include the destination base address strides and the offset stride of the plurality of pieces of second data corresponding to the second vector data.

On the one hand, the decoding unit 21 may store the count of pieces of discrete data, and may send the data offset address and the source data base address of the plurality of pieces of first data as well as the offset stride of the plurality of pieces of second data to the discrete address determining unit 22, so that the discrete address determining unit 22 may calculate a fifth storage address of each piece of first data in the storage unit 25 and a sixth storage address of each piece of second data in the storage unit 25 (in other words, discrete source addresses).

In a possible implementation, according to a data offset address (including an offset vector base address and an offset size) and a source data base address of each piece of first data, the offset load subunit 221 of the discrete address determining unit 22 may read an offset of each piece of first data from the external memory (for example, a RAM) through the bus port share. The offset load subunit 221 may cache the offset read. The offset load subunit 221 may sequentially send an offset and a base address of each piece of first data in the storage unit 25 to the discrete address generation subunit 222.

In a possible implementation, the discrete address generation subunit 222 may sequentially calculate a fifth storage address of each piece of discrete data according to the base address and the offset of each piece of first data, and may sequentially send the fifth storage address to the data read/write unit 24. On condition that two vectors are obtained by transferring, for the $n^{th}$ first data ($1 \leq n \leq N$, N is the count of pieces of first data), the fifth storage address may be expressed as a formula (3).

$$\text{Single Point Src Addr}[2n] = \text{Source Data Base Address} + \text{Offset Address}[n] \tag{3}$$

In this formula (3), Single Point Src Addr[2n] represents a fifth storage address of the $n^{th}$ first data, Source Data Base Address represents a base address of the first data, and Offset Address[n] represents an offset of the $n^{th}$ first data. When the base address for example is Addr3[15] and the offset for example is [24,27], the fifth storage address of the $n^{th}$ first data is determined to be Addr3[39,42].

In a possible implementation, in the multi-vector transfer mode, on the basis of a fifth storage address of first data, the discrete address generation subunit 222 may obtain, according to an offset stride, a sixth storage address of second data corresponding to the first data directly.

$$\text{Single Point Src Addr}[2n+1] = \text{Source Data Base Address} + \text{Offset Address}[n] + \text{Offset Stride} \quad (4).$$

In this formula (4), Single Point Src Addr[2n+1] represents a sixth storage address of second data corresponding to the $n^{th}$ first data. When the fifth storage address of the $n^{th}$ first data for example is Addr3[39,42] and the offset stride for example is 8 bits, the sixth storage address of the $n^{th}$ second data is determined to be Addr3 [47, 50].

In a possible implementation, when it is necessary to read a plurality of sets of second data to form a plurality of second vectors, the offset stride may take various values. For example, the offset stride includes 4 bits, 8 bits, 12 bits, and the like. In this way, a sixth storage address of each set of second data may be determined respectively according to different offset strides. Those skilled in the art may set the count and value of the offset stride according to actual needs, which is not limited in the disclosure.

In this way, according to a storage address of first data and the offset stride, a storage address of second data corresponding to the first data may be determined directly, so that two or more data points may be obtained by reading one time, which allows to read a relatively large number of data according to a relatively small number of addresses by an instruction (for example, one hundred data points may be read according to offset vector base address of fifty data points), thereby significantly reducing data overheads.

In a possible implementation, the discrete address queue subunit 241 of the data read/write unit 24 may receive and cache a fifth storage address and a sixth storage address, and establish a correspondence between each piece of discrete data and a caching address of a caching space in the continuous data caching unit 23, so that the discrete data read may be placed in the caching space correspondingly. For example, according to the sequential allocatable cache pointer of the continuous data caching unit 23, the caching space ID (for example, the buffer ID) is allocated for each discrete data point in the SAQ, so as to establish a correspondence between the second storage address of each piece of discrete data and the buffer ID.

In a possible implementation, the discrete address queue subunit 241 may sequentially send each fifth storage address and each sixth storage address to a respective storage load queue respectively. Each storage load queue may read discrete first data and discrete second data from the storage unit respectively, and send the discrete data read to corresponding caching addresses of the caching space in order.

The storage load queue may read the first data first and then read the second data, or may read the first data and the second data at the same time, which is not limited in the disclosure.

On the other hand, the decoding unit 21 may determine, according to a data size and a destination data base address of each piece of first data as well as a destination base address stride of each piece of second data, a third storage address of each piece of first data in the external memory and a fourth storage address of each piece of second data in the external memory (in other words, continuous destination addresses). The decoding unit 21 may send the third storage address and the fourth storage address to the continuous data caching unit 23.

In a possible implementation, the operation field of the data transfer instruction may include a destination data base address, a single point data size, a destination base address stride, and the like. Since the destination data address is a continuous data address, the destination data address (referred to as a third storage address) of each piece of first data may be determined directly in order according to a data size of each piece of first data and a serial number of each piece of first data. On condition that two vectors are obtained by transferring, the third storage address may be expressed as a formula (5).

$$\text{Single Point DestAddr}[2n] = \text{Destination Data Base Address} + (n-1) * \text{Single Point Data Size} \quad (5).$$

In this formula (5), Single Point Dest Addr[2n] represents a third storage address of the $n^{th}$ first data. For example, when the destination data base address is Addr4 [0,3], the single point data size is 4 bits, and n is 3, a third storage address of the $3^{rd}$ first data is determined to be Addr4[8,11].

In the multi-vector transfer mode, on the basis of the third storage address of first data, a fourth storage address of second data corresponding to the first data may be obtained directly according to the destination base address stride. On condition that two vectors are obtained by transferring, a fourth storage address may be expressed as a formula (6).

$$\text{Single Point Dest Addr}[2n+1] = \text{Destination Data Base Address} + (n-1) * \text{Single Point Data Size} + \text{Destination Base Address Stride} \quad (6).$$

In this formula (6), Single Point Dest Addr[2n+1] represents a fourth storage address of second data corresponding to the $n^{th}$ first data. For example, when the third storage address of the $n^{th}$ first data determined according to the destination data base address and the data size is Addr4[8, 11], and the destination base address stride is 48 bits, a fourth storage address of the $n^{th}$ second data is determined to be Addr4[56,59].

In a possible implementation, when it is necessary to read a plurality of sets of second data to form a plurality of second vectors, the destination base address stride may take various values. For example, the destination base address stride includes 48 bits, 96 bits, and the like, so as to store a plurality of pieces of vector data respectively. In this way, a fourth storage address of each set of second data may be determined respectively according to different destination base address strides. Those skilled in the art may set the count and value of the destination base address stride according to actual needs, which is not limited in the disclosure.

In this way, according to the destination data address of first data and the destination base address stride, a destination data address of second data corresponding to the first data may be determined directly, so as to store each piece of data of at least two pieces of vector data, thereby significantly reducing data overheads.

In a possible implementation, the continuous data caching unit 23 may create the caching space for the plurality of pieces of first data and the plurality of pieces of second data respectively. Upon receiving the first data and the second data from the data read/write unit, the continuous data caching unit 23 may sequentially cache each piece of first data and each piece of second data into the caching space according to a buffer ID for each piece of first data and a buffer ID for each piece of second data, so as to form continuous vector data. Once the count of pieces of first data in the caching space reaches the third preset quantity, the continuous data caching unit 23 may send the continuous data in the caching space to the third storage address of the external memory. Once the count of pieces of second data in the caching space reaches the third preset quantity, the continuous data caching unit 23 may send the continuous data in the caching space to the fourth storage address of the external memory. The third preset quantity herein may be equal to the count of pieces of continuous data capable of being cached in the caching space; in other words, the continuous data is sent to the third storage address or the fourth storage address of the external memory once the caching space is full. The third preset quantity herein may also be smaller than the count of pieces of continuous data capable of being cached in the caching space, which is not limited in the disclosure.

In this way, each piece of first data and each piece of second data are transferred in sequence, so as to obtain N pieces of continuous first data stored at the third storage address and N pieces of continuous second data stored at the fourth storage address, which may implement a process of aggregating discrete first data into first vector data and a process of aggregating discrete second data into second vector data. Therefore, data transfer is realized, which may provide a data basis for subsequent processing.

In a possible implementation, after a multi-vector data transfer is completed, a plurality of pieces of vector data may be further processed according to a data computation instruction, such as a four arithmetic computation based on at least two pieces of vector data, or a difference computation between two pieces of vector data.

In this way, pairs or sets of discrete data may be transferred to a plurality of continuous address spaces according to the data transfer instruction of the multi-vector transfer mode, and to be aggregated into a plurality of pieces of vector data respectively. As such, in an application scenario (for example, image recognition) where a large number of pairs (or sets) of discrete data points need to be computed, a plurality of pieces of vector data involved in a computation may be obtained directly according to an instruction, and a computation of discrete data points may be converted into a vector computation, which may simplify a processing process, thereby reducing data overheads.

In a possible implementation, the processing instruction may include a vector extension instruction. If the processing instruction decoded is the vector extension instruction, the source data of the plurality of pieces of data is the continuous data, the destination data of the plurality of pieces of data is the continuous data, the source data base address is the base address of the continuous data, and the destination data base address is the base address of the continuous data. The decoding unit may be further configured to:
if the processing instruction decoded is the vector extension instruction, determine a source data base address of a plurality of pieces of third data, destination data base address of a plurality of pieces of fourth data, a data size, and an extension parameter in an operation field of the vector extension instruction; and
determine a seventh storage address of the plurality of pieces of third data according to the data size and the source data base address of the plurality of pieces of third data, and send the seventh storage address to the continuous data caching unit.

The continuous data caching unit may be further configured to:
create caching space for the plurality of pieces of third data and the plurality of pieces of fourth data respectively;
read the plurality of pieces of third data from the external memory according to the seventh storage address, and cache the plurality of pieces of third data into the caching space; and
once a count of pieces of third data in the caching space reaches a fourth preset quantity, send the plurality of pieces of third data cached to the decoding unit.

The decoding unit may be further configured to:
extend the plurality of pieces of third data according to the plurality of pieces of third data from the continuous data caching unit and the extension parameter to obtain the plurality of pieces of fourth data; and
determine an eighth storage address of the plurality of pieces of fourth data according to the data size and the destination data base address of the plurality of pieces of fourth data, and send the plurality of pieces of fourth data and the eighth storage address to the continuous data caching unit.

The continuous data caching unit may be further configured to:
cache the plurality of pieces of fourth data into the caching space; and
once a count of pieces of fourth data in the caching space reaches a fifth preset quantity, send the plurality of pieces of cached fourth data to the eighth storage address of the external memory.

For example, the vector extension instruction is used to extend and store the continuous data vector according to the extension parameter. If the processing instruction decoded by the decoding unit 21 is the vector extension instruction, both source data (may be called the third data) and destination data (may be called the fourth data) are the continuous data. In this case, the source data base address of the plurality of pieces of third data, the destination data base address of the plurality of pieces of fourth data, the data size, and the extension parameter in the operation field of the vector extension instruction may be determined.

In a possible implementation, the decoding unit 21 may determine a seventh storage address of the plurality of pieces of third data in the external memory according to the data size and the source data base address of the plurality of pieces of third data, and send the seventh storage address to the continuous data caching unit.

In a possible implementation, the continuous data caching unit 23 may create the caching space for the plurality of pieces of third data and the plurality of pieces of fourth data respectively. In addition, the continuous data caching unit 23 may read the plurality of pieces of third data from the external memory according to the seventh storage address, and cache the plurality of pieces of third data into the caching space. The continuous data caching unit 23 may send the plurality of pieces of cached third data to the decoding unit once the count of pieces of third data in the caching space reaches a fourth preset quantity. The fourth preset quantity herein may be equal to the count of pieces of continuous data capable of being cached in the caching space; in other words, the continuous data is sent to the decoding unit once the caching space is full. The fourth preset quantity herein may also be less than the count of pieces of continuous data capable of being cached in the caching space, which is not limited in the disclosure.

In a possible implementation, the decoding unit 21 may extend the plurality of pieces of third data according to the plurality of pieces of third data from the continuous data caching unit 23 and the extension parameter to obtain the plurality of pieces of fourth data.

In a possible implementation, the count of the plurality of pieces of third data is M, and the extension parameter includes M extension parameter bits corresponding to M pieces of third data, where M is an integer greater than 1. Extending the plurality of pieces of third data according to the plurality of pieces of third data from the continuous data caching unit and the extension parameter to obtain the plurality of pieces of fourth data includes:

determining $k_m$ pieces of data in the $m^{th}$ data position according to the $m^{th}$ piece of third data and the $m^{th}$ extension parameter bit corresponding to the $m^{th}$ piece of third data, where $1 \leq m \leq M$, and $k_m \geq 0$; and obtaining the plurality of pieces of fourth data according to data in M data positions.

For example, the extension parameter may include M extension parameter bits, which respectively represent the number of times $k_m$ of copying M pieces of third data. If M=5, the extension parameter may be expressed as [1,2,0,3,1], which represents copying five pieces of third data once, twice, zero times, three times, and once respectively.

In a possible implementation, for the $m^{th}$ piece of third data ($1 \leq m \leq M$), the $m^{th}$ extension parameter bit corresponding to the $m^{th}$ piece of third data is $k_m$ ($k_m \geq 0$), and then the $m^{th}$ data position is determined to have $k_m$ pieces of the $m^{th}$ piece of third data. In this way, M pieces of third data may be extended respectively, to determine the data in M data positions. For example, M pieces of third data are [A, B, C, D, E] and the extension parameter is [1, 2, 0, 3, 1], after extension, the plurality of pieces of fourth data obtained are [A, B, B, D, D, D, E], which forms a piece of new vector data. The count of pieces of fourth data may be different from the count of pieces of third data.

It should be understood that, the extension parameter may further include other extension contents (for example, a value of each data point is enlarged or reduced by a certain multiple). The extension parameter may also be expressed in other manners. The extension parameter may be set by those skilled in the art according to actual needs, which is not limited in the disclosure.

In a possible implementation, the decoding unit 21 may determine an eighth storage address of the plurality of pieces of fourth data according to the data size and the destination data base address of the plurality of pieces of fourth data. The decoding unit 21 may send the plurality of pieces of fourth data and the eighth storage address to the continuous data caching unit.

In a possible implementation, the continuous data caching unit 23 may cache the plurality of pieces of fourth data into the caching space. The continuous data caching unit 23 may send the plurality of pieces of cached fourth data to the eighth storage address of the external memory once the count of pieces of fourth data in the caching space reaches a fifth preset quantity. The fifth preset quantity herein may be equal to the count of pieces of continuous data capable of being cached in the caching space; in other words, the continuous data is sent to the external memory once the caching space is full. The fifth preset quantity herein may also be less than the count of pieces of continuous data capable of being cached in the caching space, which is not limited in the disclosure.

In this way, a vector may be extended according to the vector extension instruction. As such, in the application scenario (for example, the image recognition) where extension processing of vector data is required, an original vector may be extended to a new vector and the new vector may be stored in the continuous address space, which may simplify the processing process, thereby reducing the data overheads.

It is required to be noted that, for the sake of simplicity, the foregoing device embodiments are described as a series of action combinations, however, it will be appreciated by those skilled in the art that the disclosure is not limited by the sequence of actions described. That is because that, according to the disclosure, certain steps or operations may be performed in other orders or simultaneously. Besides, it will be appreciated by those skilled in the art that the embodiments described in the specification are optional, and actions and units/modules involved are not necessarily essential to the disclosure.

It should be understood that, the foregoing apparatus embodiments are merely illustrative, and the apparatus of the disclosure may be implemented in other manners. For example, a division of unit/module in the foregoing embodiments is only a logical function division and there may be other manners of division during actual implementations. For instance, a plurality of units, modules, or components may be combined or may be integrated into another system, or some features may be ignored or may not be performed.

In addition, unless indicated otherwise, functional units/modules in various embodiments of the disclosure may be integrated into one unit/module, or each unit/module may be physically present, or two or more units/modules may be integrated into one unit/module. The above-mentioned integrated unit/module may be implemented in the form of hardware or a software program module.

If the integrated unit/module is implemented in the form of hardware, the hardware may be a digital circuit, an analog circuit, and the like. The physical realization of a hardware structure includes, but is not limited to, a transistor, a memristor, and the like. Unless specified otherwise, an intelligence processing unit may be any appropriate hardware processor, such as a central processing unit (CPU), a graphics processing unit (GPU), a field-programmable gate array (FPGA), a digital signal processor (DSP), and an application-specific integrated circuit (ASIC). Unless specified otherwise, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), and a hybrid memory cube.

The integrated unit/module may be stored in a computer-readable memory if it is implemented in the form of the software program module and is sold or used as a separate product. Based on such understanding, technical solutions of the disclosure essentially, or a part of the technical solutions that contribute to the related art, or all or a part of the technical solutions, may be embodied in the form of a software product. The software product is stored in a memory and includes several instructions to be used to enable a computer device (which may be a personal computer, a server, or a network device, and the like) to perform all or part of steps of the method described of various embodiments of the disclosure. The aforementioned memory may include various medium capable of storing program codes, such as a universal serial bus (USB), a read-only memory (ROM), a RAM, a removable hard disk, Disk, and a compact disc (CD).

In a possible implementation, an artificial intelligence chip is further provided. The artificial intelligence chip includes the data processing device above.

In a possible implementation, an electronic device is further provided. The electronic device includes the artificial intelligence chip above.

In a possible implementation, a board card is further provided. The board card includes a storage component, an interface device, a control component, and the artificial intelligence chip above. The artificial intelligence chip is coupled with the storage component, the control component, and the interface device respectively. The storage component is configured to store data. The interface device is configured to implement data transmission between the artificial intelligence chip and an external device. The control component is configured to monitor a state of the artificial intelligence chip.

Figure 4:
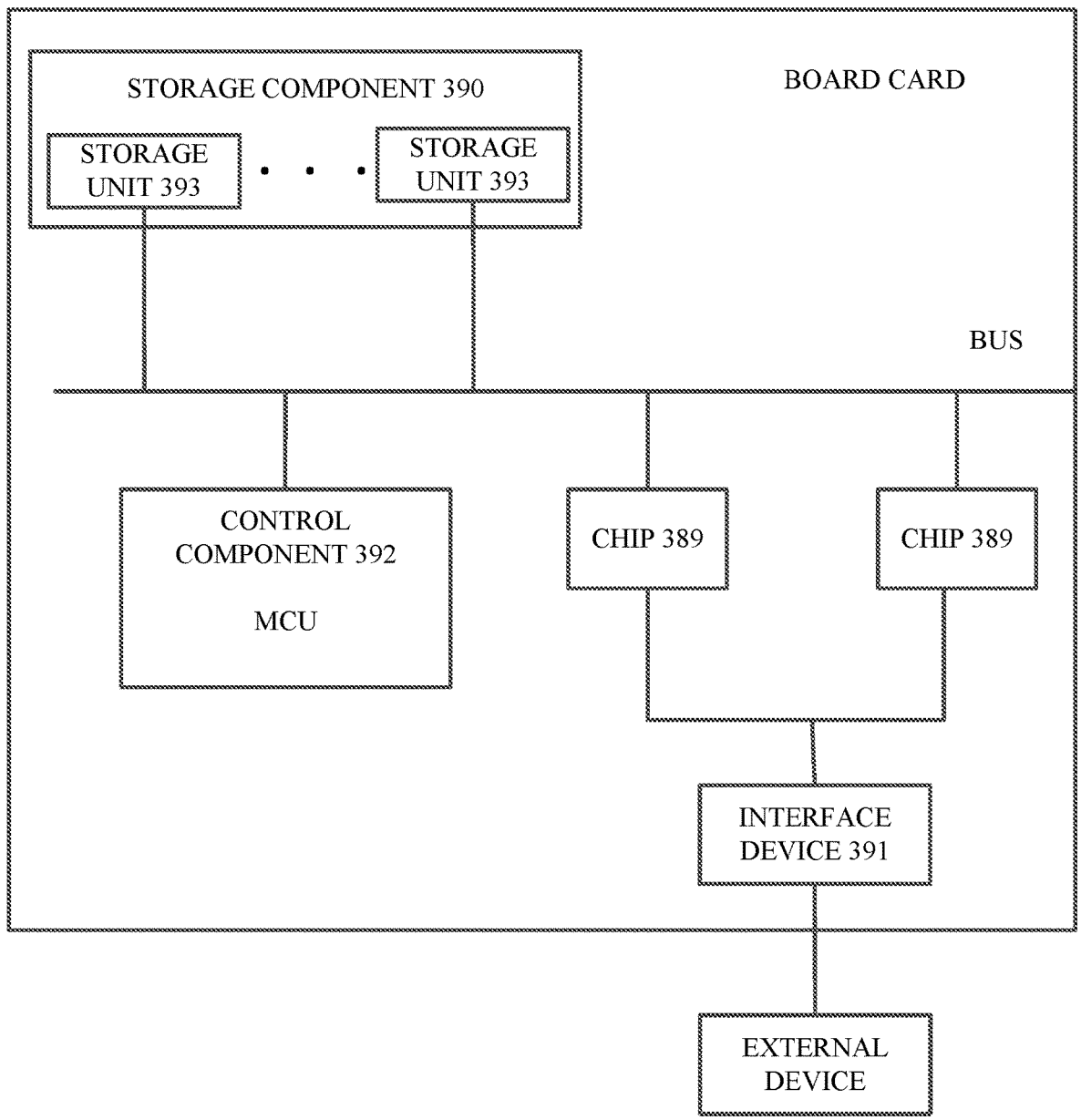
FIG. 4 is a structural block diagram of a board card according to an embodiment of the disclosure.

FIG. 4 is a structural block diagram of a board card according to an embodiment of the disclosure. Referring to FIG. 4, the board card may include other supporting components in addition to chips 389 described above. The supporting components may include, but are not limited to, a storage component 390, an interface device 391, and a control component 392.

The storage component 390 is coupled with the artificial intelligence chip via a bus, and may be configured to store data. The storage component may include a plurality of groups of storage units 393. Each group of storage units is coupled with the artificial intelligence chip via the bus. It may be understood that, each group of storage units may be a double data rate (DDR) synchronous dynamic random access memory (SDRAM).

The DDR may double a speed of the SDRAM without increasing clock frequency. The DDR may allow data to be read on rising and falling edges of a clock pulse. A speed of the DDR is twice that of a standard SDRAM. In an embodiment, the storage component may include four groups of storage units. Each group of storage units may include a plurality of DDR4 particles (chips). In an embodiment, the artificial intelligence chip inside may include four 72-bit DDR4 controllers. For a 72-bit DDR4 controller, 64 bits are used for data transmission and 8 bits are used for an error checking and correcting (ECC) parity. It may be understood that, if a DDR4-3200 particle is used in each group of storage units, a theoretical bandwidth of the data transmission may reach 25600 MB/s.

In an embodiment, each group of storage units may include a plurality of DDR SDRAMs arranged in parallel. The DDR may allow data to be transmitted twice in a clock cycle. A controller configured to control the DDR is arranged in the chip, and the controller is used to control data transmission and data storage of each storage unit.

The interface device is electrically connected with the artificial intelligence chip. The interface device is configured to implement data transmission between the artificial intelligence chip and the external device (for example, a server or a computer). For example, in an embodiment, the interface device may be a standard peripheral component interconnect express (PCIe) interface. For example, data to be processed is transferred from the server to the chip through the standard PCIe interface to realize data transfer. In some embodiments, if a PCIe 3.0×16 interface is used for transmission, a theoretical bandwidth may reach 16000 MB/s. In another embodiment, the interface device may also be other interfaces, and the disclosure does not limit specific manifestations of the other interfaces mentioned above, as long as an interface unit may realize a transfer function. In addition, a calculation result of the artificial intelligence chip is still transmitted back to the external device (for example, the server) through the interface device.

The control component is electrically connected with the artificial intelligence chip. The control component is configured to monitor a state of the artificial intelligence chip. Specifically, the artificial intelligence chip is electrically connected with the control component through a serial peripheral interface (SPI). The control component may include a micro controller unit (MCU). As mentioned above, the artificial intelligence chip may include a plurality of processing chips, a plurality of processing cores, or a plurality of processing circuits, and may drive a plurality of loads. Therefore, the artificial intelligence chip may be in different working states such as a multi-load state and a light-load state. Through the control component, regulation and control of the working states of the plurality of processing chips, the plurality of processing, and/or the plurality of processing circuits in the artificial intelligence chip may be realized.

In a possible implementation, an electronic device is provided. The electronic device may include the artificial intelligence chip above. The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment. The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In the foregoing embodiments, the description of each embodiment has its own emphasis. For parts that are not described in detail in an embodiment, reference may be made to related descriptions in other embodiments. Technical features of the foregoing embodiments may be combined arbitrarily. For the sake of concise description, not all possible combinations of various technical features in the foregoing embodiments are described. However, as long as there is no contradiction in a combination of these technical features, this combination should be considered as falling within the scope of the specification.

The foregoing may be better understood according to the following articles.

A1. A data processing device, comprising a decoding unit, a discrete address determining unit, a continuous data caching unit, a data read/write unit, and a storage unit, where
the decoding unit is configured to decode a processing instruction received to obtain a processing instruction decoded; determine a plurality of pieces of data corresponding to the processing instruction, a source data base address of the plurality of pieces of data, a destination data base address of the plurality of pieces of data, a data offset address of discrete data, and a data size of continuous data, where source data of the plurality of pieces of data includes the discrete data or the continuous data; and determine a first storage address of the continuous data according to a base address of the continuous data and the data size of the continuous data;
the discrete address determining unit is coupled with the decoding unit and the data read/write unit, and the discrete address determining unit is configured to determine a second storage address of the discrete data according to a base address of the discrete data and the data offset address of the discrete data and send the second storage address to the data read/write unit;

the continuous data caching unit is coupled with the decoding unit and the data read/write unit, and the continuous data caching unit is configured to create a caching space for the continuous data, cache the continuous data of the first storage address into the caching space and send the continuous data to the data read/write unit, or cache the continuous data received from the data read/write unit into the caching space and send the continuous data to the first storage address; and the data read/write unit is coupled with the storage unit, and the data read/write unit is configured to read the discrete data from the storage unit according to the second storage address of the discrete data and send the discrete data read to the continuous data caching unit, or receive the continuous data from the continuous data caching unit and write the continuous data received into the storage unit according to a storage address of the discrete data, where the data read/write unit includes a merge request caching subunit configured to cache storage addresses corresponding to a plurality of read requests when the discrete data is read by the data read/write unit, so that each read request is merged to read one or more pieces of discrete data.

A2. The device of A1, where the data offset address includes an offset vector base address and an offset size, and the discrete address determining unit includes:

an offset load subunit configured to determine an offset storage address of each piece of discrete data respectively according to an offset vector base address of the discrete data and an offset size of the discrete data and read an offset of each piece of discrete data from the offset storage address of each piece of discrete data; and.

a discrete address generation subunit configured to determine a second storage address of each piece of discrete data respectively according to the base address of the discrete data and the offset of each piece of discrete data and send the second storage address to the data read/write unit.

A3. The device of A1 or A2, where the data read/write unit includes:

a discrete address queue subunit configured to receive and store the second storage address of the discrete data; and a storage load queue subunit configured to read the discrete data from the storage unit according to the second storage address of the discrete data and send the discrete data read to the continuous data caching unit, or receive the continuous data from the continuous data caching unit and write the continuous data received into the storage unit according to the storage address of the discrete data.

A4. The device of A3, where the merge request caching subunit is coupled with the storage load queue subunit and the storage unit, and the merge request caching subunit is configured to:

judge whether an address corresponding to a same caching line as a target address of a read request has been cached if the read request from the storage load queue subunit is received;

cache the target address and send the read request to the storage unit if no address corresponding to the same caching line as the target address has been cached, where the read request is used to request the storage unit to return a plurality of pieces of data in a target caching line corresponding to the target address; and backfill one or more pieces of data to the storage load queue subunit if the storage unit returns the plurality of pieces of data in the target caching line, where the one or more pieces of data are data whose address corresponds to the target caching line, among data that has sent the read request to the merge request caching subunit.

A5. The device of A4, where the merge request caching subunit is further configured to:

delete the target address associated with the read request.

A6. The device of any one of A1 to A5, where the processing instruction includes a data transfer instruction, and if the processing instruction decoded is the data transfer instruction, the source data of the plurality of pieces of data is the discrete data, destination data of the plurality of pieces of data is the continuous data, a source data base address is the base address of the discrete data, and a destination data base address is the base address of the continuous data, where the data read/write unit is configured to:
read the discrete data from the storage unit according to the storage address of the discrete data; and
send the discrete data read to the continuous data caching unit; and the continuous data caching unit is configured to:
cache the discrete data received from the data read/write unit into the caching space to obtain the continuous data; and
send the continuous data in the caching space to a first storage address of an external memory if a count of pieces of continuous data in the caching space reaches a first preset quantity.

A7. The device of any one of A1 to A5, where the processing instruction includes a discrete storage instruction, and if the processing instruction decoded is the discrete storage instruction, the source data of the plurality of pieces of data is the continuous data, destination data of the plurality of pieces of data is the discrete data, a source data base address is the base address of the continuous data, and a destination data base address is the base address of the discrete data, where the continuous data caching unit is configured to:
read the continuous data from a first storage address of an external memory;
cache the continuous data read into the caching space; and
send the continuous data in the caching space to the data read and write unit if a count of pieces of continuous data in the caching space reaches a second preset quantity; and the data read/write unit is configured to:
receive the continuous data from the continuous data caching unit; and
write the continuous data received into the storage unit according to the storage address of the discrete data.

A8. The device of any one of A1 to A5, where the processing instruction includes a data transfer instruction, and if the processing instruction decoded is the data transfer instruction, the source data of the plurality of pieces of data is the discrete data, destination data of the plurality of pieces of data is the continuous data, a source data base address is the base address of the discrete data, and a destination data base address is the base address of the continuous data, where the decoding unit is further configured to:
determine a transfer mode of the data transfer instruction if the processing instruction decoded is the data transfer instruction;
determine source data base address of a plurality of pieces of first data, destination data base address of the plurality of pieces of first data, a data offset address of the plurality of pieces of first data, an offset stride of a plurality of pieces of second data, and destination base address strides of the plurality of pieces of second data in an operation field of the data transfer instruction if the transfer mode of the data transfer instruction is a multi-vector transfer mode;
determine a third storage address of the plurality of pieces of first data according to the destination data base address of the plurality of pieces of first data and the data size of the continuous data; and
determine a fourth storage address of the plurality of pieces of second data according to the third storage address of the plurality of pieces of first data and the destination base address strides of the plurality of pieces of second data; and the discrete address determining unit is further configured to:
determine a fifth storage address of the plurality of pieces of first data respectively according to the source data base address of the plurality of pieces of first data and the data offset address of the plurality of pieces of first data;
determine a sixth storage address of the plurality of pieces of second data respectively according to the fifth storage address of the plurality of pieces of first data and the offset strides of the plurality of pieces of second data; and
send the fifth storage address and the sixth storage address to the data read/write unit;

the data read/write unit is further configured to:
read first data from the storage unit according to the fifth storage address and read second data from the storage unit according to the sixth storage address; and
send the first data read and the second data read to the continuous data caching unit; and the continuous data caching unit is further configured to:
create caching space for the plurality of pieces of first data and the plurality of pieces of second data respectively;
cache the first data and the second data that are received from the data read/write unit into the caching space respectively; and
send the continuous data in the caching space to the third storage address of an external memory if a count of pieces of first data in the caching space reaches a third preset quantity and send the continuous data in the caching space to the fourth storage address of the external memory if a count of pieces of second data in the caching space reaches the third preset quantity.

A9. The device of any one of A1 to A5, where the processing instruction includes a vector extension instruction, and if the processing instruction decoded is the vector extension instruction, the source data of the plurality of pieces of data is the continuous data, destination data of the plurality of pieces of data is the continuous data, a source data base address is the base address of the continuous data, and a destination data base address is the base address of the continuous data, where the decoding unit is further configured to:
determine source data base address of a plurality of pieces of third data, destination data base address of a plurality of pieces of fourth data, a data size, and an extension parameter in an operation field of the vector extension instruction if the processing instruction decoded is the vector extension instruction; and
determine a seventh storage address of the plurality of pieces of third data according to the source data base address of the plurality of pieces of third data and the data size and send the seventh storage address to the continuous data caching unit;

the continuous data caching unit is further configured to:
create caching space for the plurality of pieces of third data and the plurality of pieces of fourth data respectively;
read the plurality of pieces of third data from an external memory according to the seventh storage address, and cache the plurality of pieces of third data into the caching space; and
send the plurality of pieces of third data cached to the decoding unit if a count of pieces of third data in the caching space reaches a fourth preset quantity;

the decoding unit is further configured to:
extend the plurality of pieces of third data according to the plurality of pieces of third data from the continuous data caching unit and the extension parameter to obtain the plurality of pieces of fourth data; and
determine an eighth storage address of the plurality of pieces of fourth data according to the destination data base address of the plurality of pieces of fourth data and the data size, and send the plurality of pieces of fourth data and the eighth storage address to the continuous data caching unit; and the continuous data caching unit is further configured to:
cache the plurality of pieces of fourth data into the caching space; and
send the plurality of pieces of fourth data cached to the eighth storage address of the external memory if a count of pieces of fourth data in the caching space reaches a fifth preset quantity.

A10. The device of A9, where the count of the plurality of pieces of third data is M, and the extension parameter includes M extension parameter bits corresponding to M pieces of third data, where M is an integer greater than 1, and
extending the plurality of pieces of third data according to the plurality of pieces of third data from the continuous data caching unit and the extension parameter to obtain the plurality of pieces of fourth data includes:
determining $k_m$ pieces of data in the $m^{th}$ data position according to the $m^{th}$ piece of third data and the $m^{th}$ extension parameter bit corresponding to the $m^{th}$ piece of third data, where $1 \leq m \leq M$, $k_m \geq 0$; and
obtaining the plurality of pieces of fourth data according to data in M data positions.

A11. An artificial intelligence chip, comprising the data processing device of any one of A1 to A10.

A12. An electronic device, comprising the artificial intelligence chip of A11.

A13. Aboard card, comprising a storage component, an interface device, and a control component, and the artificial intelligence chip of A11, where the artificial intelligence chip is coupled with the storage component, the control component, and the interface device respectively;
the storage component is configured to store data;

the interface device is configured to implement data transmission between the artificial intelligence chip and an external device; and the control component is configured to monitor a state of the artificial intelligence chip.

The embodiments of the disclosure have been described in detail above. The principles and implementations of the disclosure are described in combination with specific examples, and descriptions of the foregoing embodiments are merely used to help understand the method and core ideas of the disclosure. At the same time, any changes or modifications based on the embodiments and the application scope of the disclosure made by those skilled in the art, without departing from the spirits of the disclosure, shall all be encompassed within the protection scope of the disclosure. In conclusion, the content of the specification should not be construed as a limitation on the disclosure.

What is claimed:

1. A data processing device, comprising a decoding unit, a discrete address determining unit, a continuous data caching unit, a data read/write unit, and a storage unit, wherein the decoding unit is configured to decode a processing instruction received to obtain a processing instruction decoded and determine a plurality of pieces of data corresponding to the processing instruction, a source data base address of the plurality of pieces of data, a destination data base address of the plurality of pieces of data, a data offset address of discrete data of the plurality of pieces of data, and a data size of continuous data, wherein source data of the plurality of pieces of data comprises the discrete data or the continuous data; the decoding unit is further configured to determine a first storage address of the continuous data according to a base address of the continuous data and the data size of the continuous data;

the discrete address determining unit is coupled with the decoding unit and the data read/write unit, and the discrete address determining unit is configured to determine a second storage address of the discrete data according to a base address of the discrete data and the data offset address of the discrete data and send the second storage address to the data read/write unit;

the continuous data caching unit is coupled with the decoding unit and the data read/write unit, and the continuous data caching unit is configured to create a caching space for the continuous data, cache the continuous data of the first storage address into the caching space and send the continuous data to the data read/write unit, or cache the continuous data received from the data read/write unit into the caching space and send the continuous data to the first storage address; and the data read/write unit is coupled with the storage unit, and the data read/write unit is configured to read the discrete data from the storage unit according to the second storage address of the discrete data and send the discrete data read to the continuous data caching unit, or receive the continuous data from the continuous data caching unit and write the continuous data received into the storage unit according to a storage address of the discrete data, wherein the data read/write unit includes a merge request caching subunit configured to cache storage address corresponding to a plurality of read requests when the discrete data is read by the data read/write unit, so that each read request is merged to read one or more pieces of discrete data.

2. The device of claim 1, wherein the data offset address includes an offset vector base address and an offset size, and the discrete address determining unit includes:

an offset load subunit configured to determine an offset storage address of each piece of discrete data according to an offset size of the discrete data and an offset vector base address of the discrete data and read an offset of each piece of discrete data from the offset storage address of each piece of discrete data; and a discrete address generation subunit configured to determine a second storage address of each piece of discrete data according to the base address of the discrete data and the offset of each piece of discrete data and send the second storage address to the data read/write unit.

3. The device of claim 1, wherein the data read/write unit includes:

a discrete address queue subunit configured to receive and store the second storage address of the discrete data; and a storage load queue subunit configured to read the discrete data from the storage unit according to the second storage address of the discrete data and send the discrete data read to the continuous data caching unit, or receive the continuous data from the continuous data caching unit and write the continuous data received into the storage unit according to the storage address of the discrete data.

4. The device of claim 3, wherein the merge request caching subunit is coupled with the storage load queue subunit and the storage unit, and the merge request caching subunit is configured to:

judge whether an address corresponding to a same caching line as a target address of a read request has been cached if the read request from the storage load queue subunit is received;

cache the target address and send the read request to the storage unit if no address corresponding to the same caching line as the target address has been cached, wherein the read request is used to request the storage unit to return a plurality of pieces of data in a target caching line corresponding to the target address; and backfill one or more pieces of data to the storage load queue subunit if the storage unit returns the plurality of pieces of data in the target caching line, wherein the one or more pieces of data are data whose address corresponds to the target caching line, among data that has sent the read request to the merge request caching subunit.

5. The device of claim 4, wherein the merge request caching subunit is further configured to:

delete the target address associated with the read request.

6. The device of claim 1, wherein the processing instruction includes a data transfer instruction, and if the processing instruction decoded is the data transfer instruction, the source data of the plurality of pieces of data is the discrete data, destination data of the plurality of pieces of data is the continuous data, the source data base address is the base address of the discrete data, and the destination data base address is the base address of the continuous data, wherein the data read/write unit is configured to:

read the discrete data from the storage unit according to the storage address of the discrete data; and send the discrete data read to the continuous data caching unit; and the continuous data caching unit is configured to:
cache the discrete data received from the data read/write unit into the caching space to obtain the continuous data; and
send the continuous data in the caching space to a first storage address of an external memory if a count of pieces of continuous data in the caching space reaches a first preset quantity.

7. The device of claim 1, wherein the processing instruction includes a discrete storage instruction, and if the processing instruction decoded is the discrete storage instruction, the source data of the plurality of pieces of data is the continuous data, destination data of the plurality of pieces of data is the discrete data, the source data base address is the base address of the continuous data, and the destination data base address is the base address of the discrete data, wherein
the continuous data caching unit is configured to:
read the continuous data from a first storage address of an external memory;
cache the continuous data read into the caching space; and
send the continuous data in the caching space to the data read/write unit if a count of pieces of continuous data in the caching space reaches a second preset quantity; and
the data read/write unit is configured to:
receive the continuous data from the continuous data caching unit; and
write the continuous data received into the storage unit according to the storage address of the discrete data.

8. The device of claim 1, wherein the processing instruction includes a data transfer instruction, and if the processing instruction decoded is the data transfer instruction, the source data of the plurality of pieces of data is the discrete data, destination data of the plurality of pieces of data is the continuous data, the source data base address is the base address of the discrete data, and the destination data base address is the base address of the continuous data, wherein
the decoding unit is further configured to:
determine a transfer mode of the data transfer instruction if the processing instruction decoded is the data transfer instruction;
determine a source data base address of a plurality of pieces of first data, destination data base address of the plurality of pieces of first data, a data offset address of the plurality of pieces of first data, an offset stride of a plurality of pieces of second data, and a destination base address stride of the plurality of pieces of second data in an operation field of the data transfer instruction if the transfer mode of the data transfer instruction is a multi-vector transfer mode;
determine a third storage address of the plurality of pieces of first data according to the destination data base address of the plurality of pieces of first data and the data size of the continuous data; and
determine a fourth storage address of the plurality of pieces of second data according to the third storage address of the plurality of pieces of first data and the destination base address stride of the plurality of pieces of second data;
the discrete address determining unit is further configured to:
determine a fifth storage address of the plurality of pieces of first data according to the source data base address of the plurality of pieces of first data and the data offset address of the plurality of pieces of first data;
determine a sixth storage address of the plurality of pieces of second data according to the fifth storage address of the plurality of pieces of first data and the offset stride of the plurality of pieces of second data; and
send the fifth storage address and the sixth storage address to the data read/write unit;
the data read/write unit is further configured to:
read first data from the storage unit according to the fifth storage address and read second data from the storage unit according to the sixth storage address; and
send the first data read and the second data read to the continuous data caching unit; and
the continuous data caching unit is further configured to:
create caching space for the plurality of pieces of first data and the plurality of pieces of second data respectively;
cache the first data and the second data that are received from the data read/write unit into the caching space respectively; and
send the continuous data in the caching space to the third storage address of an external memory if a count of pieces of first data in the caching space reaches a third preset quantity and send the continuous data in the caching space to the fourth storage address of the external memory if a count of pieces of second data in the caching space reaches the third preset quantity.

9. The device of claim 1, wherein the processing instruction includes a vector extension instruction, and if the processing instruction decoded is the vector extension instruction, the source data of the plurality of pieces of data is the continuous data, destination data of the plurality of pieces of data is the continuous data, the source data base address is the base address of the continuous data, and the destination data base address is the base address of the continuous data, wherein
the decoding unit is further configured to:
determine a source data base address of a plurality of pieces of third data, destination data base address of a plurality of pieces of fourth data, a data size, and an extension parameter in an operation field of the vector extension instruction if the processing instruction decoded is the vector extension instruction; and
determine a seventh storage address of the plurality of pieces of third data according to the source data base address of the plurality of pieces of third data and the data size and send the seventh storage address to the continuous data caching unit;
the continuous data caching unit is further configured to:
create caching space for the plurality of pieces of third data and the plurality of pieces of fourth data respectively;
read the plurality of pieces of third data from an external memory according to the seventh storage address, and cache the plurality of pieces of third data into the caching space; and
send the plurality of pieces of third data cached to the decoding unit if a count of pieces of third data in the caching space reaches a fourth preset quantity;
the decoding unit is further configured to:
extend the plurality of pieces of third data according to the plurality of pieces of third data from the continuous data caching unit and the extension parameter to obtain the plurality of pieces of fourth data; and
determine an eighth storage address of the plurality of pieces of fourth data according to the destination data base address of the plurality of pieces of fourth data and the data size, and send the plurality of pieces of fourth data and the eighth storage address to the continuous data caching unit; and the continuous data caching unit is further configured to:

cache the plurality of pieces of fourth data into the caching space; and send the plurality of pieces of fourth data cached to the eighth storage address of the external memory if a count of pieces of fourth data in the caching space reaches a fifth preset quantity.

10. The device of claim 9, wherein the count of the plurality of pieces of third data is M, and the extension parameter includes M extension parameter bits corresponding to M pieces of third data, wherein M is an integer greater than 1, and extending the plurality of pieces of third data according to the plurality of pieces of third data from the continuous data caching unit and the extension parameter to obtain the plurality of pieces of fourth data includes:

determining $k_{cm}$ pieces of data in the $m^{th}$ data position according to the $m^{th}$ piece of third data and the $m^{th}$ extension parameter bit corresponding to the $m^{th}$ piece of third data, wherein $1 \leq m \leq M$, $k_m \geq 0$; and obtaining the plurality of pieces of fourth data according to data in M data positions.

* * * * *